United States Patent [19]

Hutter, Jr. et al.

[11] Patent Number: 5,788,849

[45] Date of Patent: Aug. 4, 1998

[54] FILTER SYSTEM

[76] Inventors: James E. Hutter, Jr., 13226-97th NE., Apt. C-208, Kirkland, Wash. 98034; Christopher D. Probst, 1217 NW. 122nd St., Seattle, Wash. 98177

[21] Appl. No.: 484,834

[22] Filed: Jun. 7, 1995

Related U.S. Application Data

[63] Continuation-in-part of Ser. No. 207,483, Mar. 4, 1994, abandoned, which is a continuation-in-part of Ser. No. 891,712, Jun. 1, 1992, abandoned.

[51] Int. Cl.⁶ .......................................................... C02F 9/00
[52] U.S. Cl. ........................... 210/163; 210/170; 210/262; 210/266; 210/282
[58] Field of Search ................................. 210/155, 163, 210/164, 170, 232, 262, 266, 282, 165, 166, 237, 238, 335, 339, 484

[56] References Cited

U.S. PATENT DOCUMENTS

| | | | |
|---|---|---|---|
| 2,615,526 | 10/1952 | Lane | 182/2 |
| 3,243,942 | 4/1966 | Burke | 96/129 |
| 3,713,539 | 1/1973 | Thompson et al. | 210/164 |
| 3,770,128 | 11/1973 | Kast | 210/169 |
| 3,961,920 | 6/1976 | Gilbert | 55/387 |
| 4,111,813 | 9/1978 | Preus | 210/282 |
| 4,130,489 | 12/1978 | Black | 210/DIG. 26 |
| 4,261,823 | 4/1981 | Gallagher et al. | 210/164 |
| 4,268,390 | 5/1981 | Cunningham | 210/232 |
| 4,419,232 | 12/1983 | Arntyr et al. | 210/164 |
| 4,689,145 | 8/1987 | Mathews et al. | 210/170 |
| 4,935,132 | 6/1990 | Schaier | 210/163 |
| 5,037,541 | 8/1991 | Ruey-Jang et al. | 210/141 |
| 5,223,154 | 6/1993 | MacPherson, Jr. et al. | 210/790 |

OTHER PUBLICATIONS

Geotextile Specifications, Amoco Fabrics and Fibers Company, 1991.

Nonwoven Geotextiles, Amoco Fabrics and Fibers Company, 1991.

*Primary Examiner*—Ivars Cintins
*Attorney, Agent, or Firm*—Christensen O'Connor Johnson Kindness PLLC

[57] ABSTRACT

Disclosed is a filter system (10) for use in filtering contaminants and sediments as well as introducing aeration of the liquids flowing into a storm drain (20). The filter system may include a housing (12) that is positioned beneath the storm drain, underneath the outer grating (24) of the storm drain. A rack (14) holds a plurality of filter components (16) in a substantially horizontal orientation within the housing. The filter components house filter materials, including absorbent materials and/or geotextile fabric.

38 Claims, 17 Drawing Sheets

FILTER SYSTEM

This application is a continuation-in-part of U.S. patent application Ser. No. 08/207,483, filed Mar. 4, 1994, now abandoned, which is a continuation-in-part of U.S. patent application Ser. No. 07/891,712, filed Jun. 1, 1992, now abandoned, the benefit of the filing of which are hereby claimed under 35 U.S.C. §120. U.S. patent application Ser. Nos. 07/891,712 and 08/207,483 are hereby incorporated by reference.

FIELD OF THE INVENTION

The present invention relates to filter systems in general and, in particular, to a storm drain filter system for filtering sediments and contaminants from liquid flowing therethrough.

BACKGROUND OF THE INVENTION

Environmental awareness is rapidly increasing as scientists and others consider the effect pollution is having on rivers, lakes, and oceans and underground water supplies. These bodies of water are inundated with pollution stemming from a number of sources, including factories, food processing and surface water run-off that enters the bodies of water through storm drains, carrying herbicides, pesticides, petroleum, and other pollutants that have been collected along the way.

A number of filter systems have been proposed and are currently being used in factories in an attempt to filter processing water that is polluted through manufacturing operations. Filter systems have also been proposed for storm drains, but their use has been limited, apparently due to inconvenience, cost, and the lack of governmental regulations that would require the removal of contaminants from run-off water and other liquids flowing through a storm drain system. However, as more contaminants from water run-off, processing liquids, and other liquids is being emphasized. There is a continuing need for an efficient, cost-effective filter system that will remove sediments and contaminants from liquids while allowing aeration to occur and minimizing the work required to maintain the filter system.

SUMMARY OF THE INVENTION

The invention is a filter system having filter material, e.g., absorbent material, to treat liquid flowing therethrough. The filter system includes: (a) a housing having a peripheral wall defining a filter chamber therein, the filter chamber including an inlet for inflow of the liquid and an outlet for discharging the liquid; (b) a removable rack for placement within the filter chamber of the housing, the rack being movable between a first position received in the filter chamber and a second position removed from the filter chamber; and (c) one or more filter components, each filter component supporting a quantity of the filter material, the filter components normally being held by the rack in the path of liquid flow but being separable therefrom when the rack is in the second position.

In accordance with other aspects of the invention, the filter system is for a drainage system, the drainage system having an outer grating supported on a ledge that extends around the perimeter of the drainage system, with the filter system using absorbent materials positioned to filter liquid flowing therethrough.

In accordance with another aspect of the invention, the filter system includes: (a) a housing to be positioned within the drainage system and underneath the outer grating, the housing having a top that is nearest the protective grating and a bottom opposite the top; (b) one or more filter components, each filter component including absorbent materials and means for supporting the absorbent materials, the absorbent materials removing contaminants and particulate matter from liquid flowing into the drainage system and through the filter system; and (c) a removable rack dimensioned to fit into the housing and including a plurality of holding members that support the filter components, the housing and rack having cooperating members that in a first position are engaged to support the rack within the housing, and that in a second position are disengaged to allow the rack to be separated from the housing to provide access to the filter components.

In accordance with still further aspects of the invention, the filter components comprise a removable container having four side walls and a lower grate, with at least two of the side walls including rails that support the lower grate. In another aspect of the invention, the removable container further includes an upper grate that is supported by the removable container in a position above the lower grate. The filter materials are placed in the removable container, between the lower and upper grates.

In accordance with further aspects of the invention, the filter components of the filter system comprise a plurality of grates, each providing a shelf for supporting absorbent materials. Further, each grate includes a set of downwardly-extending projections disposed on opposite sides of the grate that cooperatively engage cross members located on the rack to hold the grate onto the rack. In this aspect, the absorbent materials are housed using a plurality of removable, porous containers that are supported by the grates.

In accordance with further aspects of the invention, the filter system includes a trough-shaped, uppermost grate that is supported in inverted orientation by the rack, with the peak of the uppermost grate being adjacent the top of the housing and the sides of the uppermost grate extending downward, toward the bottom of the housing.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
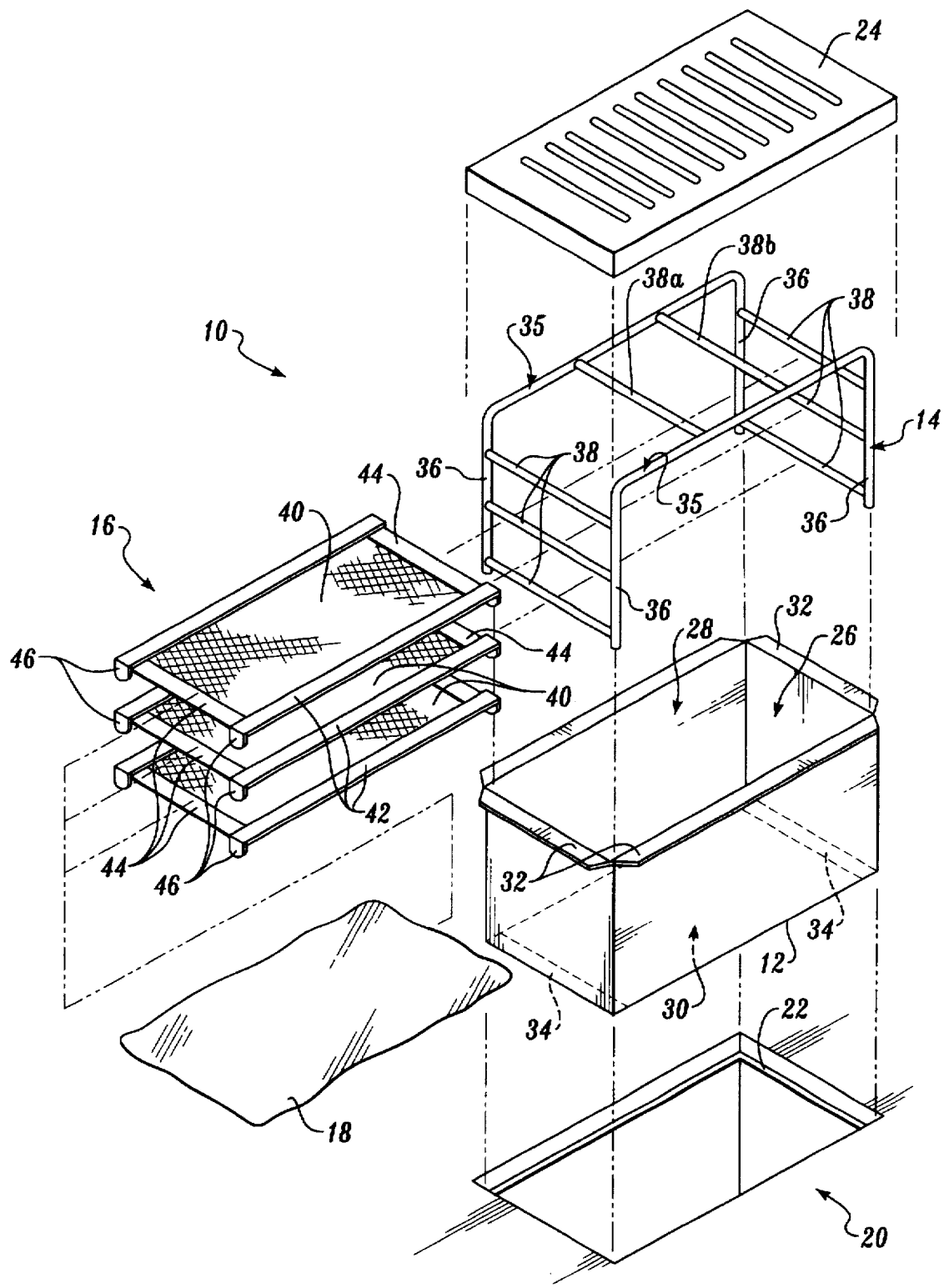
FIG. 1 is an exploded perspective view of a first exemplary embodiment of a filter system in accordance with the invention.
Figure 2:
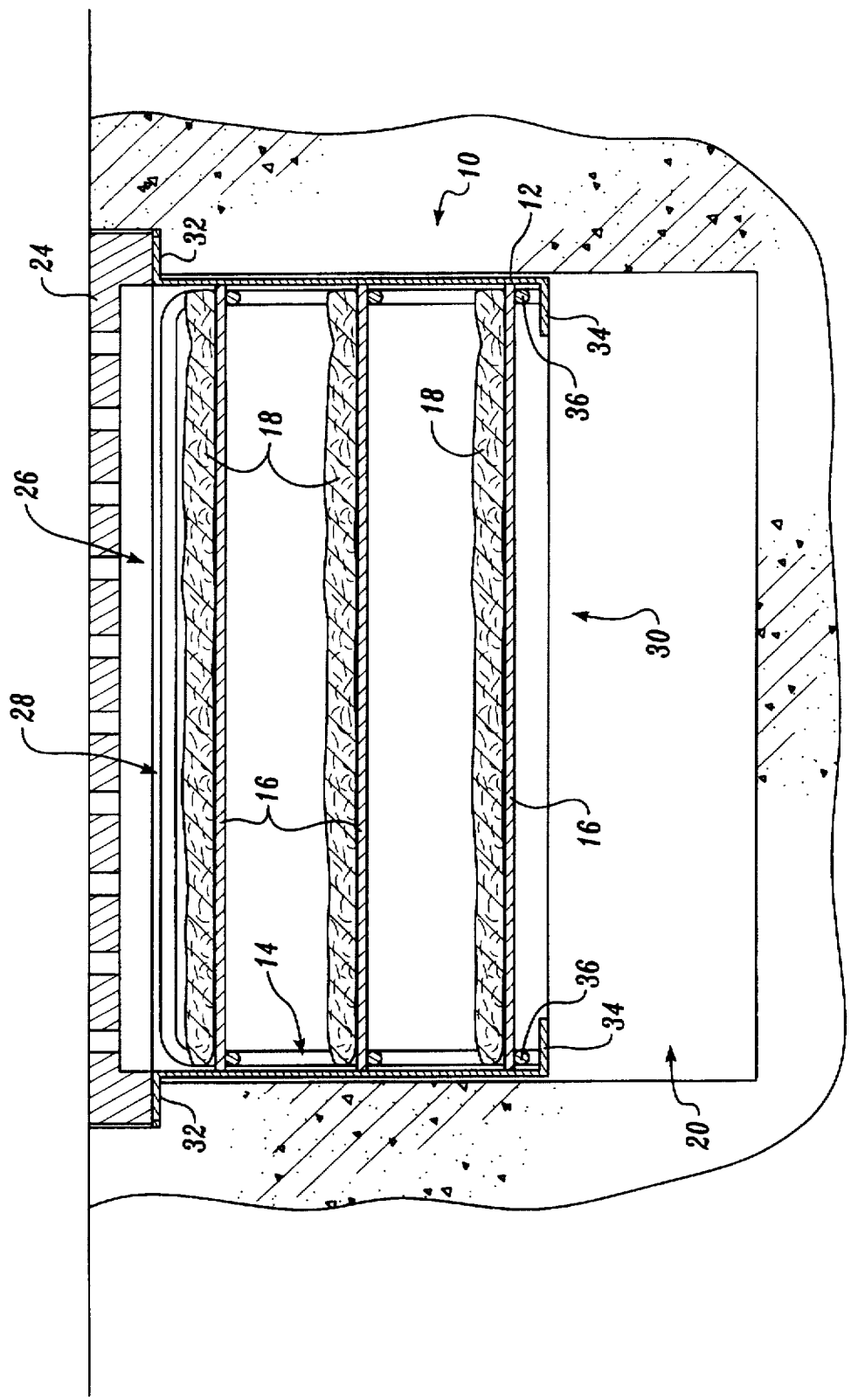
FIG. 2 is a cross section of the filter system of FIG. 1.
Figure 3:
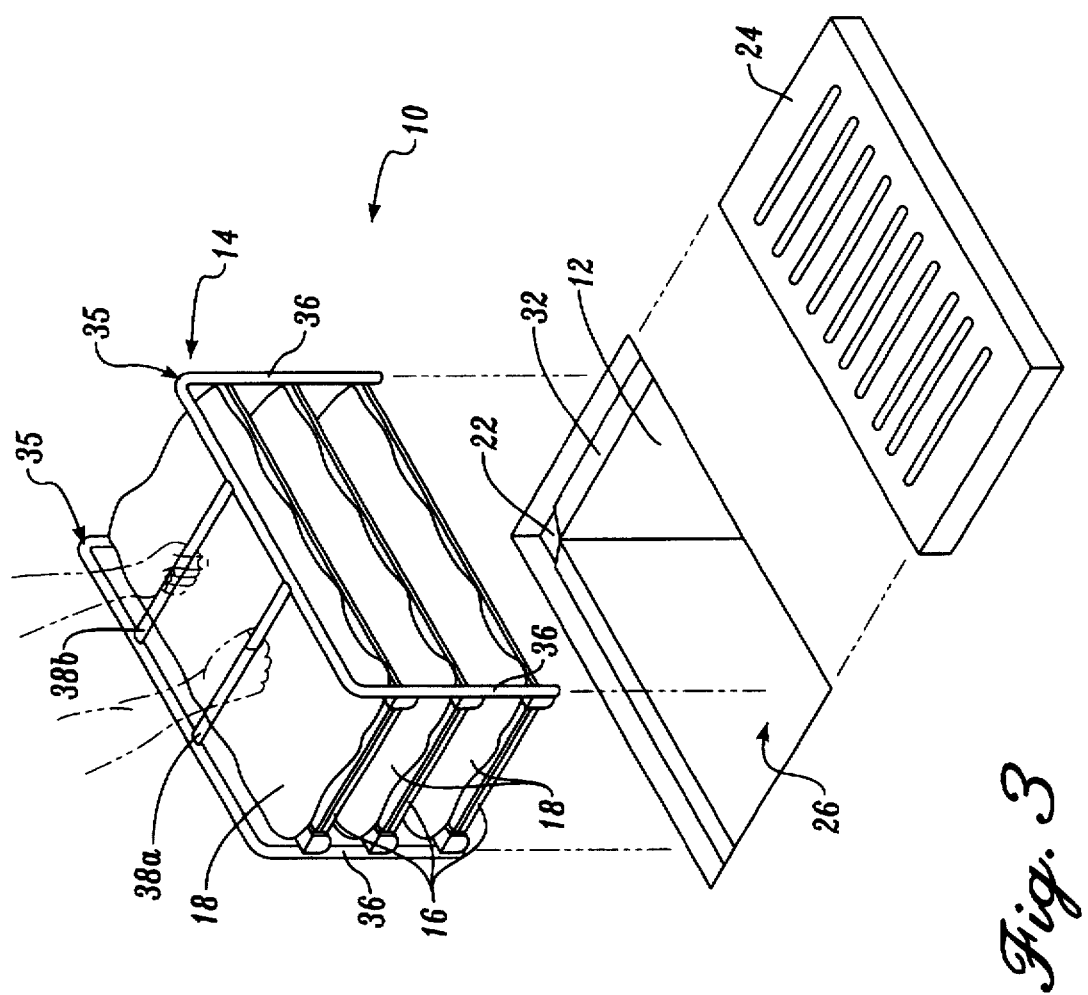
FIG. 3 is a side perspective view of the filter system of FIG. 1.

FIGS. 1–3 illustrate a first exemplary embodiment of a filter system 10 in accordance with the invention. Filter system 10 includes a housing 12, a removable rack 14 that holds a plurality of expanded gratings (grates) 16, and a plurality of containers 18 for holding absorbent materials used to remove contaminants from liquid flowing through the filter system. The filter system 10 may be used in a number of environments or drainage systems, for example, in a factory for filtering processing liquids and underneath a storm drain for filtering ground water run-off. Throughout the specification and in the figures, the filter system is shown in use within a storm drain, which is only one of the preferred uses of the filter system.

FIGS. 1–3 illustrate a typical storm drain 20 used by municipalities that is, for example, located along a curbside and coupled to a storm sewer system that drains into a body of water to be protected from contaminants. Storm drain 20 includes a rectangular-shaped ledge 22 that extends around the storm drain perimeter for supporting an outer grating 24. The filter system 10 is dimensioned to fit into a typical storm drain, beneath the outer grating. Water and other liquid entering the storm drain will thus be directed into the filter system 10, through the containers 18 and subsequently out of the filter system. As is shown in FIG. 3, the rack 14 is removable to allow absorbent material housed in the containers to be easily replaced and subsequently recycled.

The housing 12 is illustrated as having four sides that define a rectangular-shaped filter chamber 26 having a top inlet 28 adjacent the outer grating 24 of the storm drain, and a bottom outlet 30 for discharging liquids into the storm drain system. An outwardly extending flange 32 extends around the upper perimeter of the housing. The flange 32 is dimensioned to rest on the ledge 22 of the storm drain, just below the outer grating 24. Two oppositely disposed, inwardly extending flanges 34 are provided at the bottom of the housing for use in supporting the rack 14. In some applications, it is desirable to enclose the bottom of the housing 12 with a grating or mesh screen. The housing 12 is preferably constructed of a noncorrosive, but high-strength and lightweight, material, such as stainless steel, aluminum, fiber glass, or plastic.

The rack 14 includes two formed, generally U-shaped side members 35, each including a pair of legs 36. The side members are coupled together by a plurality of cross members 38. The rack is dimensioned slightly smaller than the inner walls of the housing such that the rack fits into the filter chamber 26 with the legs 36 resting on the inwardly extending flanges 34 of the housing. A top pair of cross members 38a and 38b provide handles to allow the rack 14 to be conveniently lifted from the housing, as is shown in FIG. 3. The remaining cross members 38 are positioned in pairs on opposite sides of the rack to span between corresponding legs 36 of the side members 35 to provide supports for the ends of the grates 16 and hold the grates substantially parallel to the top of the housing 12. In this manner, the grates are generally held in an orientation that is perpendicular to the flow of liquid through the filter system. An example of suitable material for the legs 36 and cross members 38 is quarter-inch diameter stainless steel that is cut, welded and bent to form the shape illustrated in FIGS. 1–3.

The grates 16 each include a rectangular-shaped mesh surface 40 composed of a suitable material such as stainless steel, aluminum or plastic. The surface 40 is supported around its perimeter by a pair of parallel side bars 42 and a pair of parallel end bars 44. The grates 16 are slightly longer and narrower than the rack 14. The side bars 42 are slightly longer than the grate, with each side bar 42 including a downwardly extending portion at the ends thereof that form tabs 46 that cooperatively engage the cross members 38 of the rack when the grate is positioned within the rack. Suitable materials for the mesh filter surface 40 are expanded metal or hardware cloth. However, the mesh filter surface can also be composed of a plastic material.

Each grate 16 supports one or more of the containers 18, which are filled with absorbent materials. The size of the apertures in the grates will, to an extent, determine the rate of liquid flow through the filter system and the type and size of debris that is collected on the grates, as opposed to being filtered through the filter system. The size of the grate apertures could decrease from top to bottom so that larger debris is collected at the top of the filter system. As will be appreciated by those skilled in the art, a wire mesh screen or geotextile fabric such as Amoco™ geotextile nos. 4535, 4545, 4551 may be used in addition to or as one or more of the grates 16 to collect smaller particles of debris, sediment, and dirt. If a screen alone is used, it is preferably supported around its perimeter with side and end bars similar to those depicted in FIG. 1.

The containers 18 are preferably slightly longer and wider than the grates 16 such that when the rack is positioned within the housing, the containers 18 contact the sides of the housing to prevent liquid from flowing between the containers and walls of the filter chamber 26. Preferably, each container has an opening through which spent absorbent materials may be removed and replaced with new or recycled materials. The opening is releasably closed by, for example, a hook and latch mechanism such as that sold under the trademark Velcro™. The container may also be closed by providing a slide fastener (not shown) at an end thereof or through other means known in related arts.

The containers 18 may be composed of a porous, supple mesh fabric or other porous, non-corroding, inert material to permit the entry of liquid flowing through the filter system.

Suitable materials for this use is nylon or a geotextile fabric. Each container houses material that is capable of absorbing contaminants from liquid flowing through the filter system. When filled with absorbent material the containers resemble a pillow shape. For example, the containers may include a layer of activated charcoal, activated carbon, Absorbent W™, or other product as desired, depending upon the types of pollutants to be collected. Absorbent W™ is a product available from the Total Absorbent Company and is especially useful in absorbing petroleum products. Other products such as activated charcoal or sand are available that absorb herbicides, pesticides, chemical fertilizers and other contaminants to be collected. It will be appreciated that the types and amounts of absorbent materials used will depend on the types and amounts of pollutants in the liquid being filtered. Further, the relative location of the materials will also depend on these factors. For example, it may be desirable to place the Absorbent W™ above the charcoal or other absorbent materials. The size of the containers 18 on the vertical spacing between the grates 16 can be varied to accommodate the size (volume) and quantity of the containers 18.

As will be appreciated, the filter system 10 provides an economical and safe method of collecting contaminants from liquids such as storm and surface water run-off flowing into storm drain systems and processing liquids. Collection points and sources of such liquids are industrial areas, parking lots, streets, construction sites and manufacturing operations. In an actual embodiment of the present invention, the filter system has a maximum rate of liquid flow on the order of about 200 gallons per minute per square foot of filter system surface area. The filter system has been found to effectively remove at least 89 percent of harmful contaminants, such as gasoline and other fuels, pesticides, and herbicides, at this rate of flow.

Figure 4:
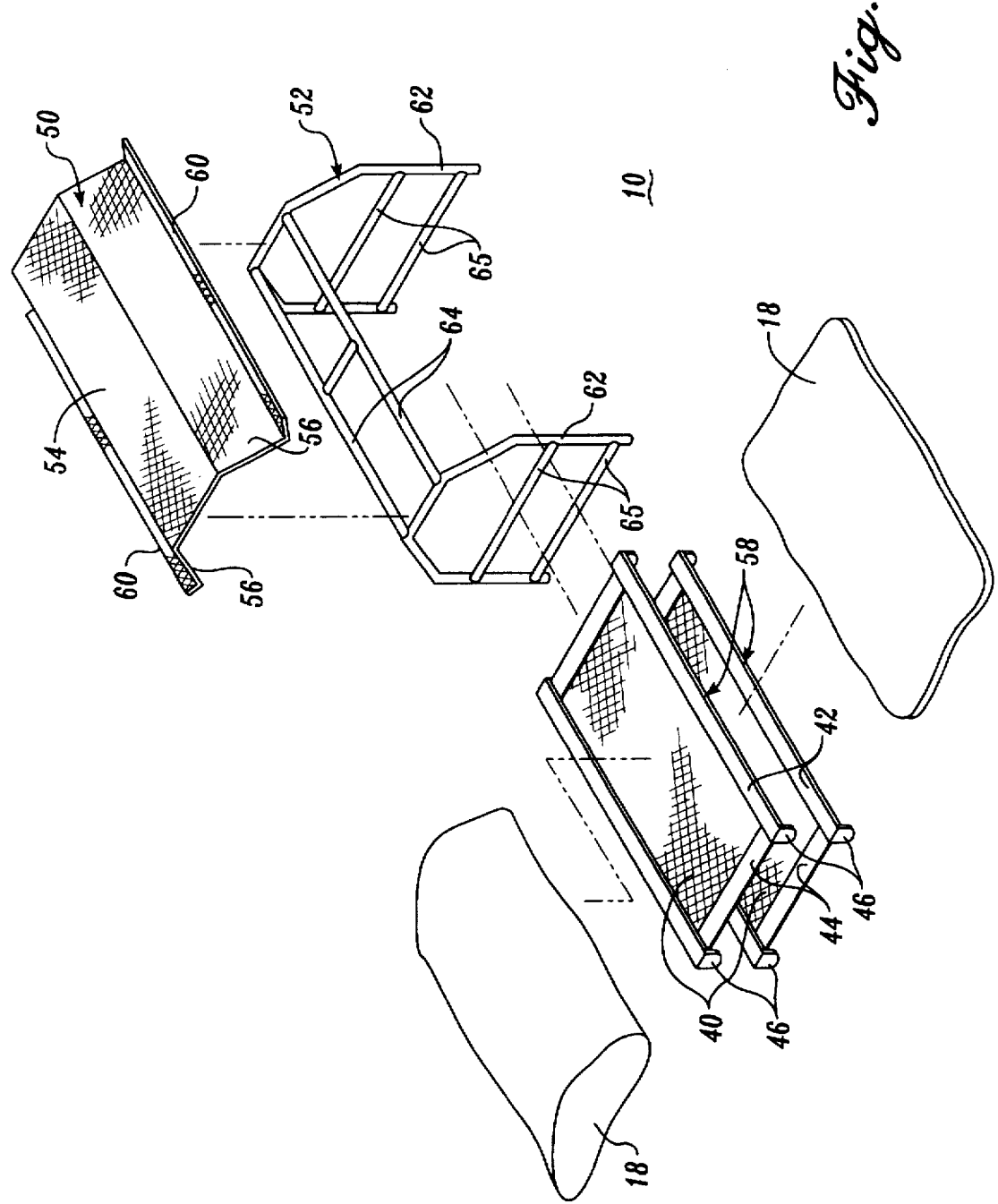
FIG. 4 is an exploded perspective view of a second exemplary embodiment of a filter system in accordance with the invention.
Figure 5:
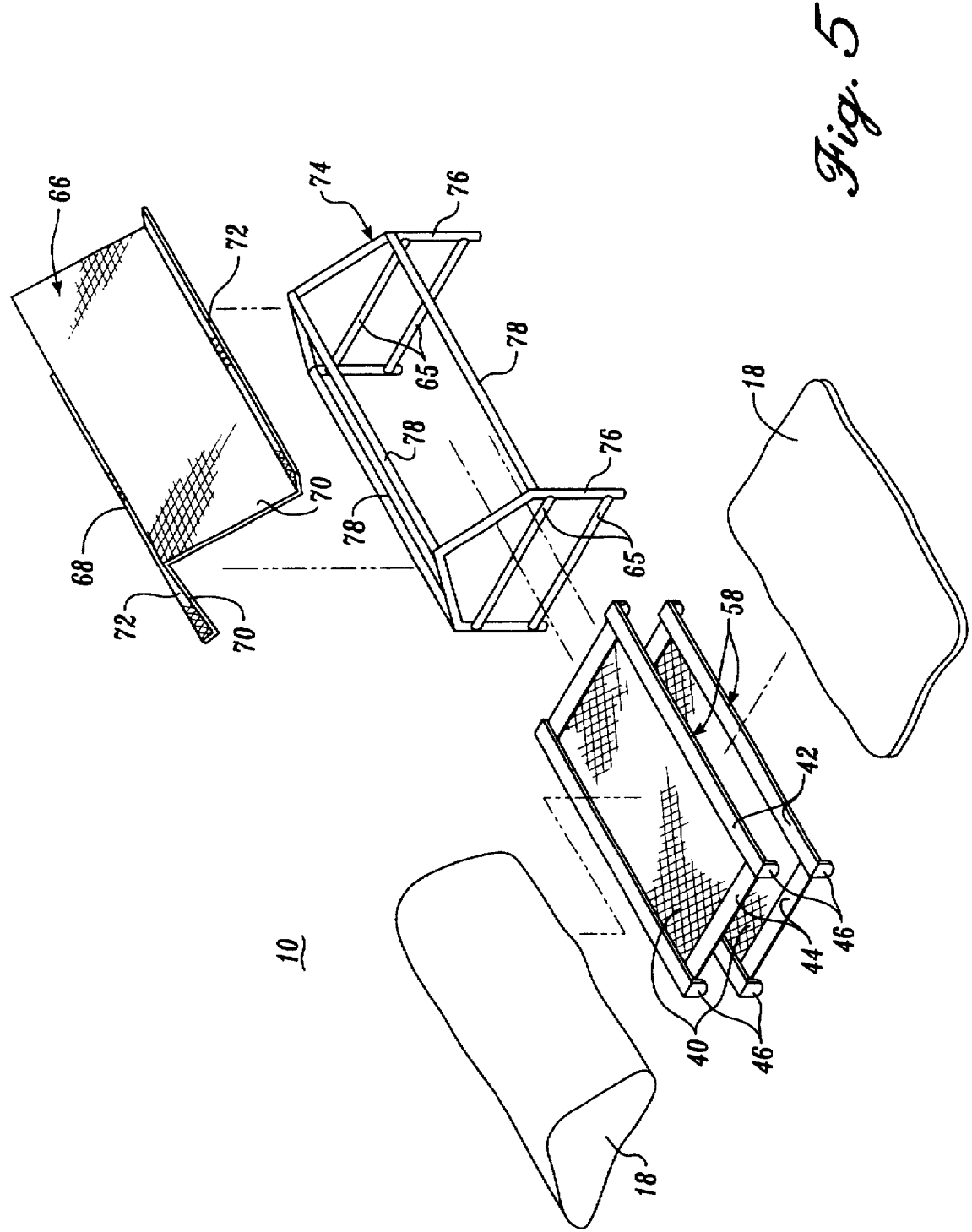
FIG. 5 is an exploded perspective view of a third exemplary embodiment of a filter system in accordance with the invention.
Figure 6:
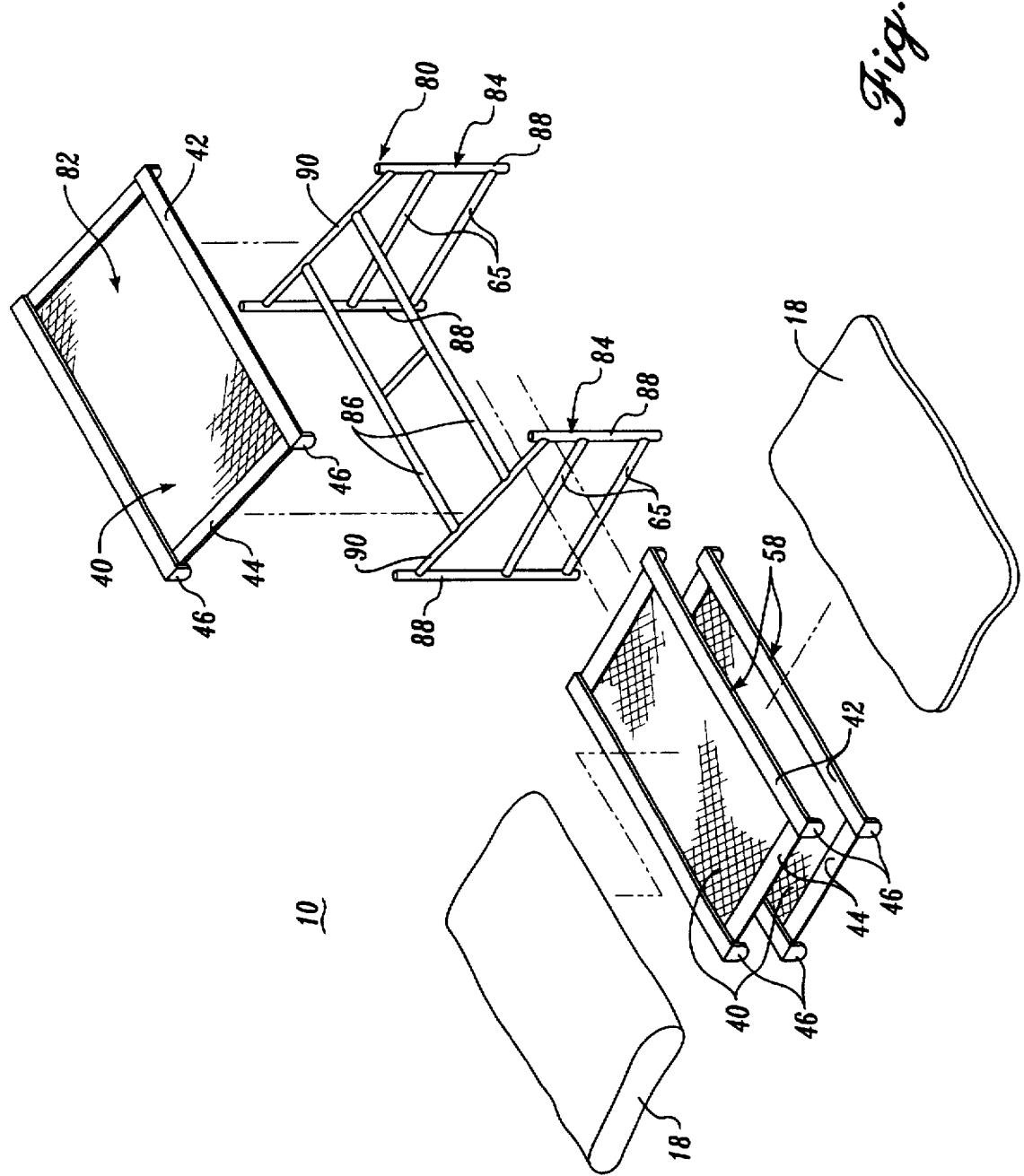
FIG. 6 is an exploded perspective view of a fourth exemplary embodiment of a filter system in accordance with the invention.

It has been found that when the uppermost grate is flat, debris may collect across the surface of the grate, substantially reducing the flow of liquids through the filter system. To reduce this problem, the filter system 10 may be configured with an uppermost grate that will provide a collection point for the debris and yet allow liquids to freely flow through the filter system. FIGS. 4–6 illustrate exemplary embodiments of an uppermost grate and rack that will minimize the effect of debris on the filter system.

FIG. 4 illustrates a second exemplary embodiment of the filter system 10, including a trough-shaped, uppermost grate 50 that is supported in an inverted orientation by a rack 52. The grate 50 includes a substantially flat, longitudinal middle section 54 that extends substantially across the length of the housing (not shown) when the grate is positioned therein, and side sections 56 that slope downwardly from the middle section 54. Preferably the width for the middle section is about 40 to 60 percent of the total width of the grate 50. Given this width, the side sections extend downwardly at a slope of about forty-five degrees relative to the middle section 54. Preferably, the lower edge of each side section 56 is slightly upturned, forming a lip 60 along each side of the grate 50.

The rack 52 is similar to the rack 14 of FIGS. 1–3, except that the top of the rack is shaped to accommodate the grate 50. In that regard, the rack 52 includes end sections 62 that are coupled together by a plurality of longitudinal support rods 64. In addition to supporting the end sections 62, the support rods provide a handle for removing the rack from the housing, after the uppermost grate 50 has been removed. The end sections 62 each have two legs that extend upwardly from the housing, parallel to the sides of the housing, until reaching a height that corresponds to the lowest portion of the uppermost grate 50, where the legs extend toward the middle of the rack at a slope approximately equal to the slope of the side sections 56 of the uppermost grate 50. Thus, the upper portions of the end sections and the uppermost grate 50 are shaped similar to a truncated triangle of an inverted orientation.

Each of the end sections 62 include cross members 65 that extend across the width of the rack 52 and provide support to a plurality of additional grates 58 that are substantially the same as the grates 16 of FIGS. 1–3. Each of the additional grates includes a mesh filter surface 40, side bars 42, end bars 44, and projections 46. Containers 18 of absorbent material are placed on the lower grates 58 prior to positioning the rack 52 and uppermost grate 50 into the housing. Containers holding absorbent material are generally not positioned on top of the uppermost grate 50.

The uppermost grate 50 provides a two-fold purpose. First, debris entering the storm drain will tend to collect at the lower portions of the grate, leaving the higher portions unobstructed and free to pass liquid to the lower portions of the filter system. Second, the shape of the grate has a tendency to distribute liquid entering the filter system across the entire surface area occupied by the filter system, allowing greater filtering capability. The lips 60 aid in collecting smaller debris, such as cigarette butts, that enters the filter system but that is too large to filter through the uppermost grate 50. Further, the lips 60 allow the uppermost grate to be removed from a storm drain without the debris falling into the storm drain.

FIG. 5 illustrates a third exemplary embodiment of the filter system 10, wherein an uppermost grate 66 is substantially triangular in cross section. Grate 66 includes a longitudinal peak 68 and sides 70 that slope downwardly from the peak, toward the housing (not shown). As with the grate 50 of FIG. 4, the lower edges of the sides 70 are upturned to form lips 72. A rack 74 supports the grate 66 with two end sections 76 that are connected by longitudinal support rods 78. The rack 74 also includes cross members 65 that provide support to the lower grates 58. One of the longitudinal support rods 78 substantially abuts the peak 68 of the uppermost grate 66 when the grate is positioned onto the rack. The upper portions of the end sections 76 support the sides 70 of the uppermost grate 66 near each end of the grate.

As will be appreciated by those skilled in the art, the grates 50 and 66 of FIGS. 4 and 5 may be of other configurations that provide at least some of the benefits described in relation to the uppermost grates 50 and 66. Exemplary grates include configurations that have a slightly rounded uppermost section with flat sides or a configuration wherein the entire grate is substantially semicircular in cross section.

FIG. 6 illustrates a fourth exemplary embodiment of the filter system 10. In FIG. 6, a rack 80 is configured to hold an uppermost grate 82 at a slope having an angle on the order of about 30 to 60 degrees relative to the horizontal. The rack 80 includes end sections 84 that are coupled together by a plurality of longitudinal support rods 86. Each end section includes a pair of legs 88, uppermost cross members 90 that support the uppermost grate 82, and lower cross members 65 that support the lower grates 58. The grate 82 is similar to grates 58, but is slightly wider than the lower grates to accommodate the increased distance between the legs 88 that results from the sloped orientation of the uppermost grate. Thus, the uppermost grate 82 will nearly abut the walls of the housing when the rack is positioned therein.

The embodiment of FIG. 6 is designed to be placed in topographies in which the land surrounding the storm drain is at a slope relative to the storm drain. The rack 80 and uppermost grate 82 are preferably positioned such that liquid flowing into the storm drain enters the lowest part of the uppermost grate first. In this manner, the liquid is directed downwardly into the filter system rather than tending to flow across the filter system.

Figure 7:
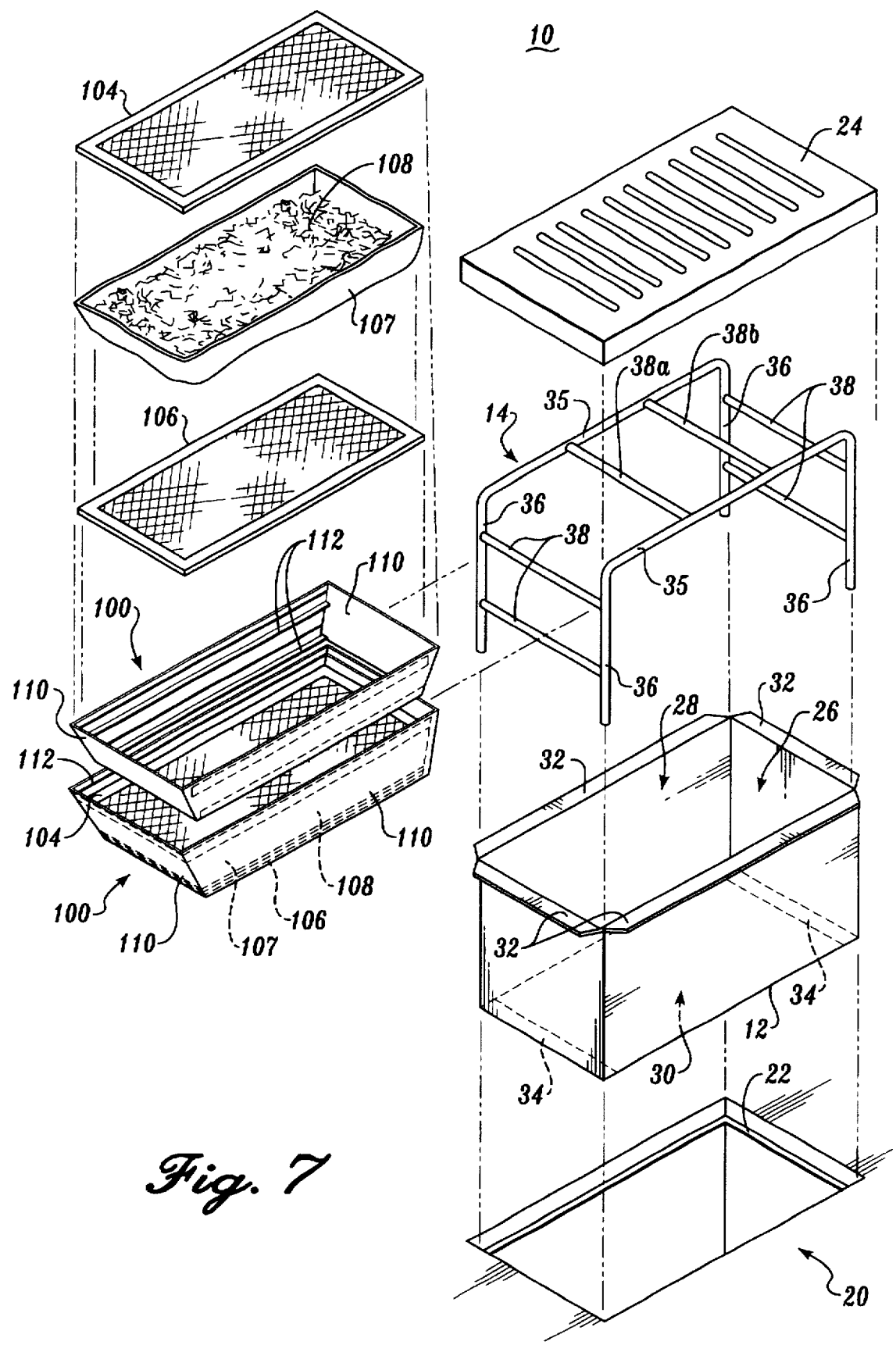
FIG. 7 is an exploded perspective view of a fifth exemplary embodiment of a filter system in accordance with the invention.
Figure 8:
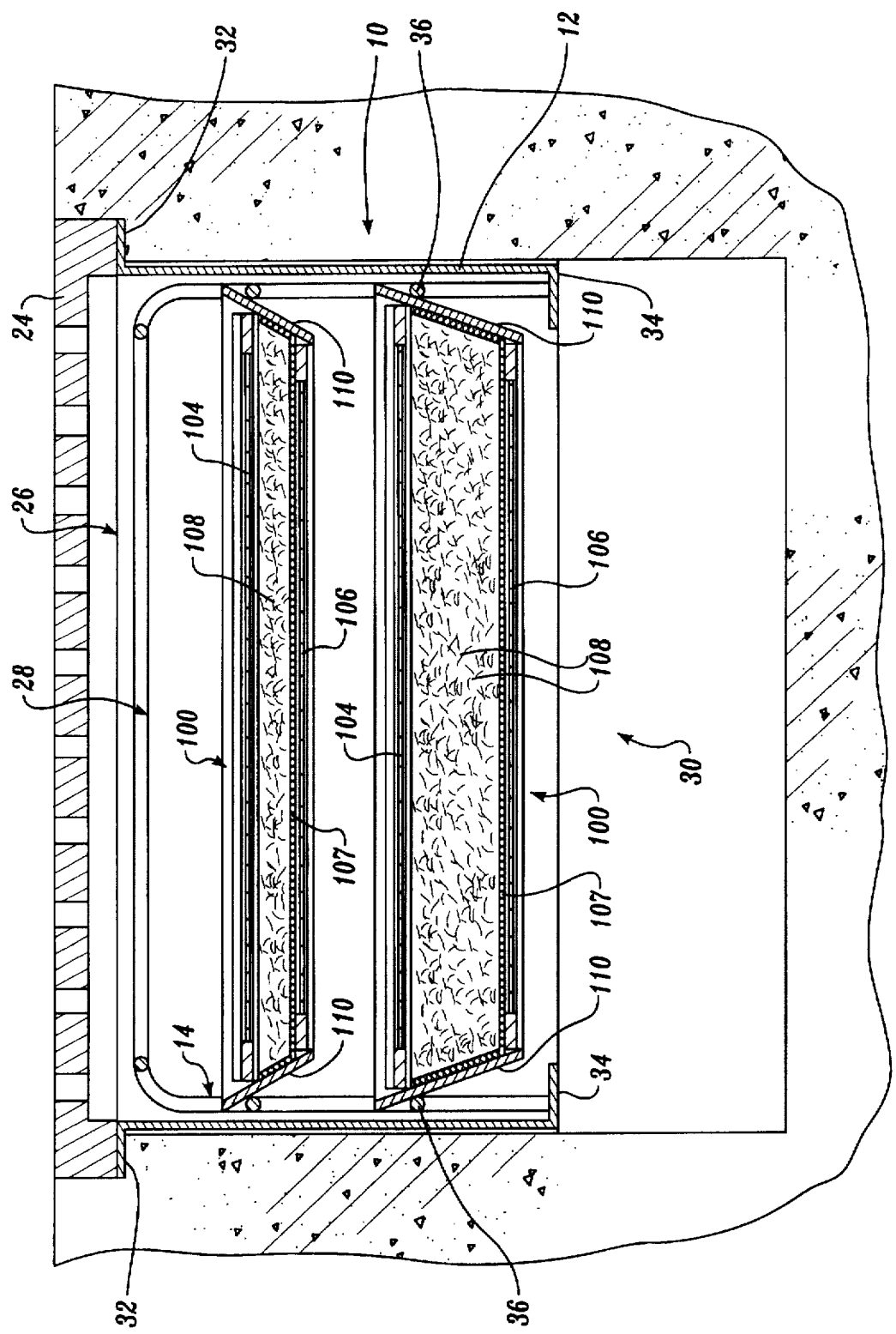
FIG. 8 is a cross section of the filter system of FIG. 7.

FIGS. 7 and 8 illustrate a fifth exemplary embodiment of the filter system 10 in which the grates 16 and containers 18 (shown in FIG. 1) have been replaced by grate support structures 100 and a pair of top and bottom grates 104 and 106. Instead of being held within pillow-shaped containers 18, absorbent materials 108 are housed within the support structures 100 and grates 104 and 106. Preferably, a geotextile material 107 is also included along the lower grate 106 to help contain the absorbent material 108. Other than replacing the grates 16 and containers 18 shown in FIGS. 1–3 with grates 104 and 106 and support structures 100, the filter system shown in FIGS. 7 and 8 is substantially the same as the filter system shown in FIGS. 1–3.

Each support structure 100 includes four sides 110, two of which include a pair of side rails 112 for supporting the grates 104 and 106. To use the support structures 100, the bottom grate 106 is positioned onto the lower side rails 112, and the geotextile fabric 107, if used, is placed on the lower grate and along the sides 110 of the support structure 100. Absorbent materials 108 are then placed within the grate support structure 100, on top of the geotextile fabric 107. The top grate 104 is then positioned onto the upper side rails 112, above the absorbent material. As is shown in FIGS. 7 and 8, the support structures 100 may be of various depths depending upon the amount of absorbent material that is to be housed therein. It will also be appreciated that a different number of the support structures 100 may be employed.

The support structures 100 prevent "bunching" of the absorbent materials that sometimes may occur when the containers 18 are used. Further, liquid flowing through the support structures 100 is less likely to drain between the edges of the containers and housing wherein it is not filtered by the absorbent materials in the filter system.

It is noted that there are some applications, for example, at construction sites and at other outfalls, where filtering of contaminants is not required but in which sediment filtering is desirable. The filter system 10 of FIGS. 7–8 will best accommodate such applications by including a single one of the support structures 100, including the top and bottom grates 104 and 106, and geotextile fabric 107, with the depth of the support structure 100 being increased to minimize maintenance (emptying) of the filter system.

Figure 9:
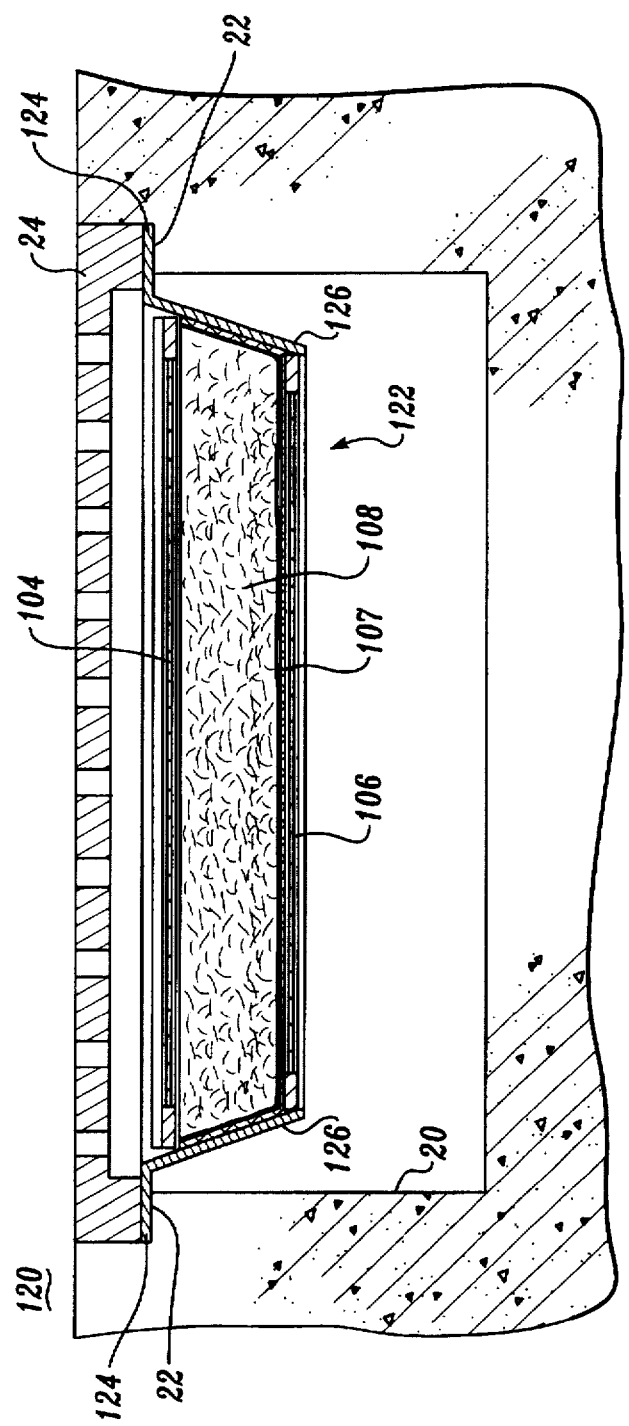
FIG. 9 is a cross section of a sixth exemplary embodiment of a filter system in accordance with the invention.

FIG. 9 illustrates a sixth embodiment of a filter system 120 that may be used in storm drains that are too shallow to accept the complete filter system 10 illustrated in FIGS. 1–8. Filter system 120 comprises a support structure 122 which is similar in construction to support structure 100 shown in FIGS. 7 and 8, but including an outwardly directed flange 124 that extends around the upper perimeter of the support structure 122 to rest on the ledge 22 of the storm drain 20. Otherwise, the filter system 120 operates in the manner similar to the filter system shown in FIGS. 7 and 8. Also, as with the filter system described in FIGS. 7 and 8, the filter system 120 may also be used to collect sediment only.

Figure 10:
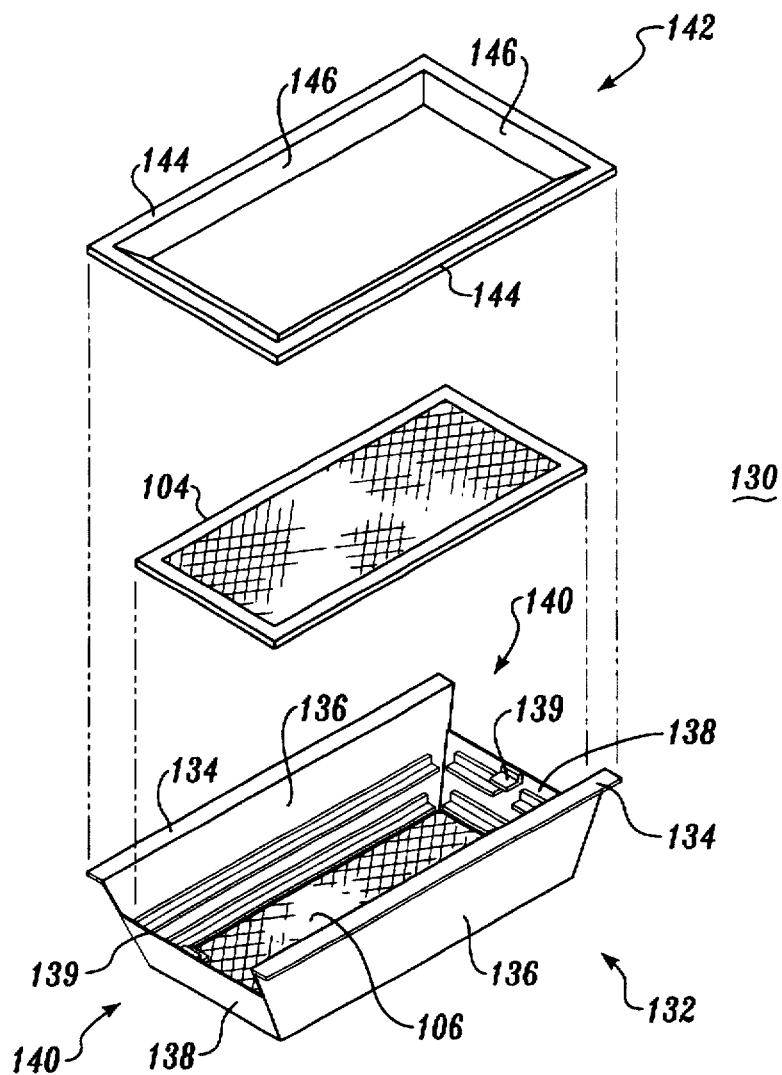
FIG. 10 is an exploded perspective view of a seventh exemplary embodiment of a filter system in accordance with the invention.

FIG. 10 illustrates a seventh exemplary embodiment of a filter system 130 in accordance with the invention. Filter system 130 comprises a support structure 132 which is similar in construction to support structure 100 shown in FIGS. 7 and 8. Support structure 132 includes two outwardly directed flanges 134 that extend the length of a pair of sides 136 to rest on the ledge 22 of the storm drain 20 when the filter system is in place. The filter system 130 generally operates in the manner similar to the filter system shown in FIGS. 7 and 8.

The filter system 130 includes a pair of end walls 138 that, in conjunction with the sides 136, provide support for the grates 104 and 106. A pair of clips 139 holds the upper grate 104 in place. Further, each end wall 138 includes a cutout portion 140 that allows liquid to flow out of the filter system and into the storm drain should an overflow condition exist, e.g., if the filter system becomes clogged or otherwise drains too slowly to accommodate the flow of liquid entering the storm drain. The cutout portions prevent accumulation of surface liquid at the entrance of the storm drain during such an overflow condition. It is noted that in some applications, where it is imperative that liquid not escape the filter system without processing, it may be more advantageous to exclude the cutouts 140, thereby allowing the liquid to accumulate and subsequently drain at a flow rate conducive to the filter system. An alternative is to remove overflow liquid as it enters a type of cutout near the location of cutouts 140 for processing at an adjacent site or, if desired, even off-site.

The filter system 130 also includes a feature that helps to ensure liquids entering the storm drain are directed into the filter system 130, and thus do not escape filtration by seeping through the cutouts 140 or around the fringe of the filter system. A funnel-like diverter 142 includes a perimeter section 144 that rests on top of the flanges 134, underneath the outer grating of the storm drain. Extending down and inwardly from the perimeter section 144 are walls 146 that direct liquids flowing into the storm drain onto the grate 104 of the filter system. The diverter is preferably a separate component to facilitate removal of the grate 104 and subsequent access to absorbent material housed within the filter system 130.

Figure 11:
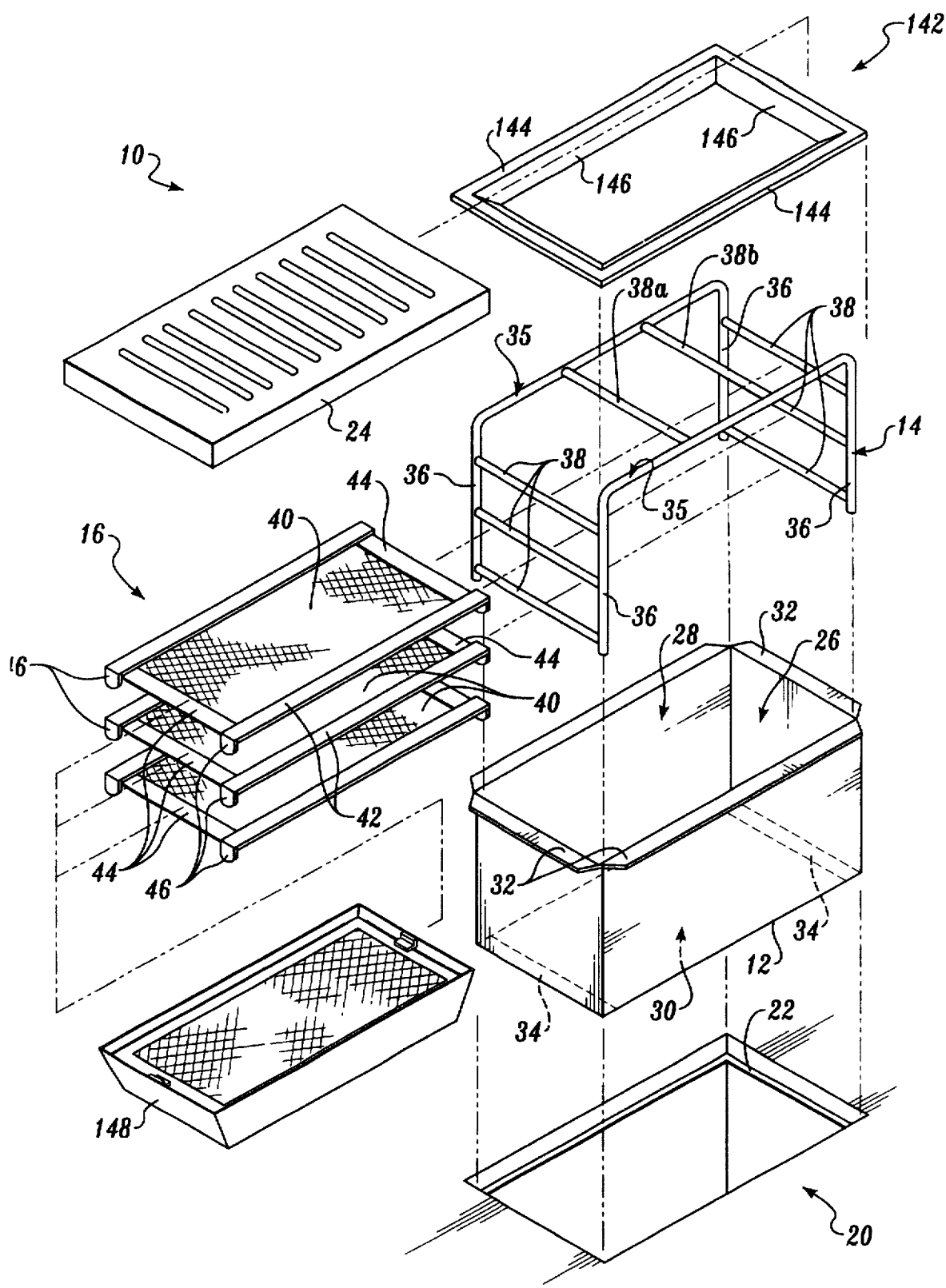
FIG. 11 illustrates an eighth exemplary embodiment of a filter system in accordance with the invention which is similar to the filter system of FIG. 1, except in which trays are used to house absorbent materials.
Figure 12:
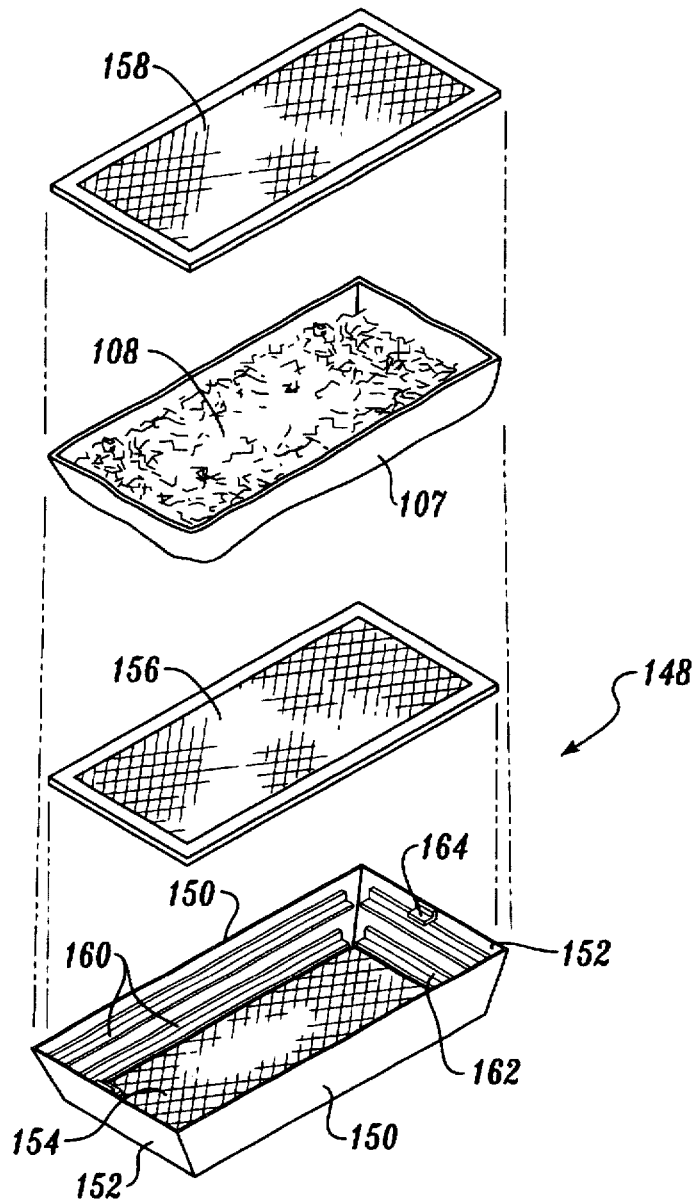
FIG. 12 is an exploded perspective view of the trays illustrated in FIG. 1.

FIGS. 11 and 12 illustrate an eighth exemplary embodiment of the filter system 10 that combines the features of the embodiments illustrated in FIGS. 1 and 7. More particularly, each of the containers 18 (shown in FIG. 1) have been replaced by a filter component or tray 148 for holding absorbent materials. The trays 148 are similar to the grate support structures 100 but include structural differences that will become apparent from the discussion below. Further, in contrast to the embodiment of FIG. 7, the trays 148 rest on perforate plates, such as the grates 16, and not directly on the cross members 38 of the rack 14. Finally, in a preferred embodiment of the invention, the filter system includes the diverter 142 that was described in reference to FIG. 10. Again, it is advantageous for the diverter to be removable to facilitate removal of the rack 36 and accompanying hardware.

Preferably FIG. 12 is an exploded perspective view of one of the trays 148. Each tray includes side walls 150, end walls 152, a bottom grate 154, a lower grate 156 and an upper grate 158. The side and end walls 150 and 152 include pairs of side and end rails 160 and 162, respectively, that hold the lower and upper grates 156 and 158. A clip 164 is positioned near the middle of each end wall to hold the upper grate in place. To use the trays 148, the lower grate 156 is positioned onto the lower side and end rails 160 and 162, and the geotextile fabric 107, if used, is placed on the lower grate and along the sides of the tray. Absorbent materials 108 are then placed within the tray, on top of the geotextile fabric 107. The upper grate 158 is then positioned onto the upper side and end rails 160 and 162, above the absorbent material.

It is noted that the term "filter component" is used to refer to any means described herein or similar structure that provides support for filter or absorbent materials, including: (1) the combination of grates 16 and containers 18 shown in FIG. 1, (2) the support structures 100 shown in FIG. 7, and (3) the trays 148 shown in FIG. 11.

The embodiment of FIGS. 11 and 12 has a number of advantages. One advantage is that overflow liquids will drain from an upper tray to a lower tray down the exterior of the end walls 152 of the trays. In this manner, if the uppermost tray becomes clogged with sediment or the like, liquids will flow to the next tray and continue to be filtered by the filtering system. It is noted that the end walls slant inwardly to ensure that overflow liquids are directed into the next tray. Another advantage is the addition of the diverter 142 for ensuring liquids are processed by the filter system 10. The embodiment of FIGS. 11 and 12 has all of these advantages as well as those described above, and yet still provides a removable rack that enables the trays to be easily and conveniently removed from the housing 12, thus providing access to the absorbent materials and the grates.

Figure 13:
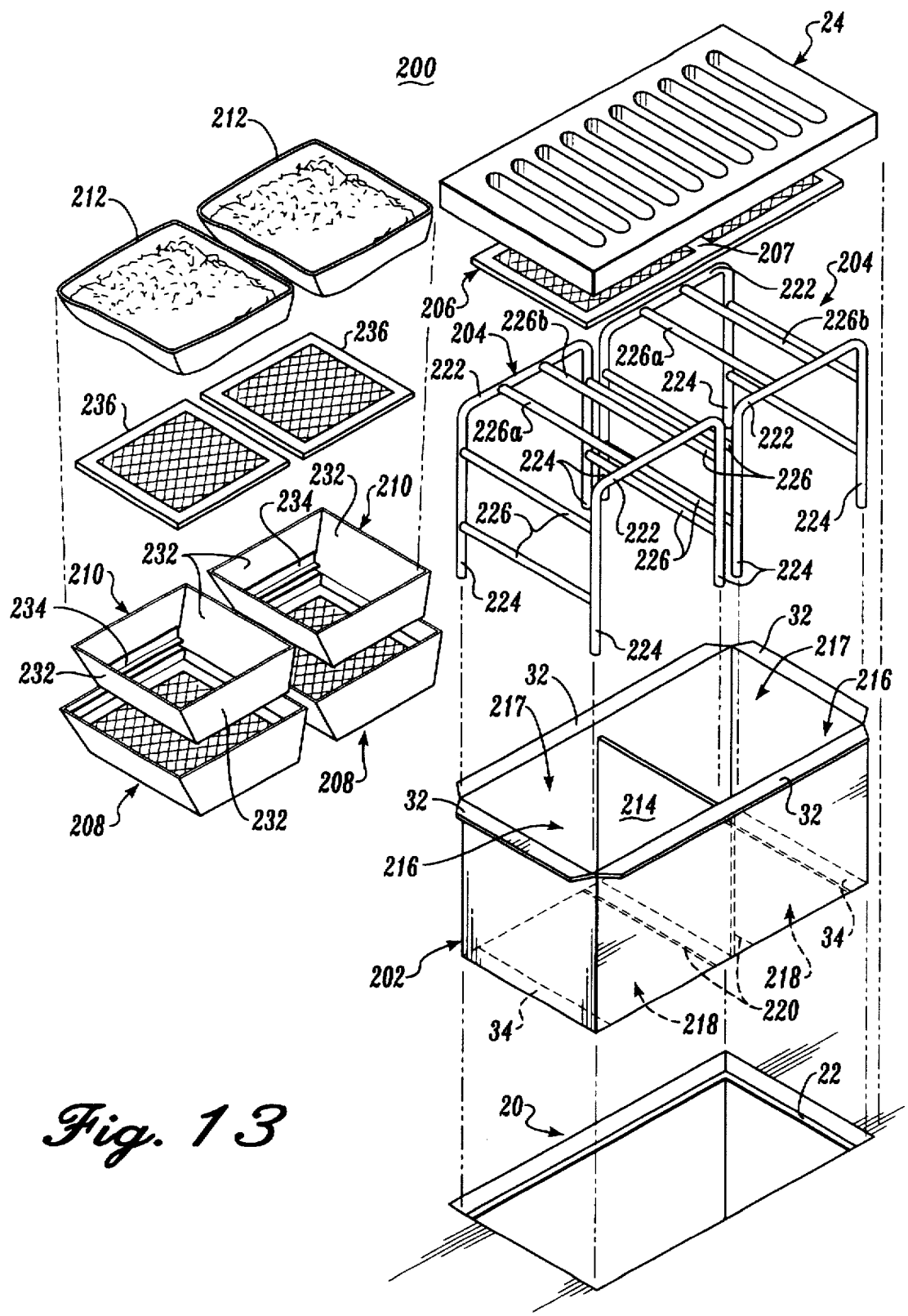
FIG. 13 illustrates a ninth exemplary embodiment of a filter system in accordance with the invention which is similar to the filter system of FIG. 7, except that the rack and accompanying filter components have been split into halves.
Figure 14:
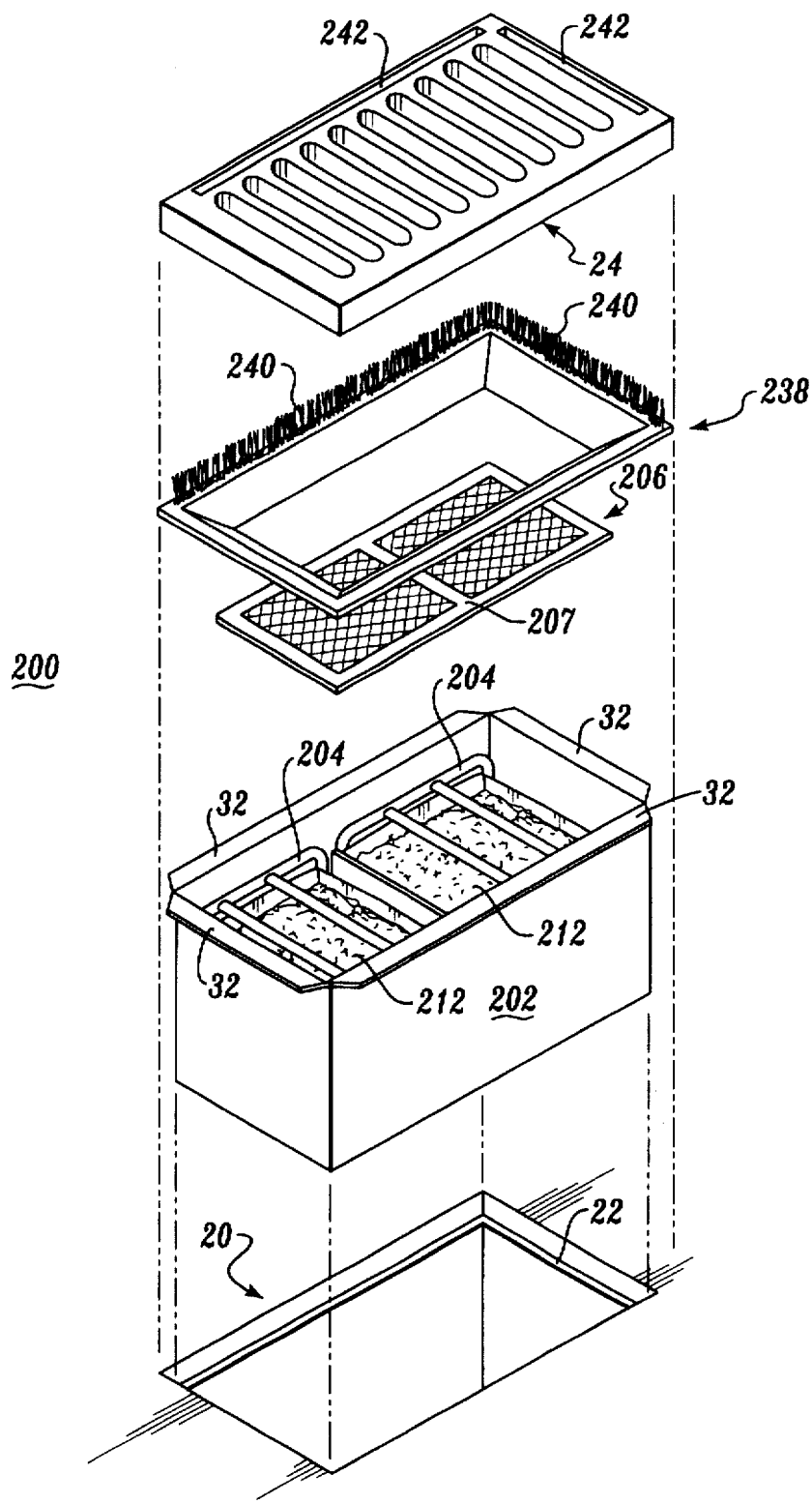
FIG. 14 is a perspective view of the filter system of FIG. 13.

FIGS. 13 and 14 illustrate a ninth exemplary filter system 200 in accordance with the invention. The filter system 200 includes a housing 202, a pair of removable racks 204 and an upper screen or grate 206. As shown most clearly in FIG. 14, the upper grate preferably includes a cross member 207 that extends across the upper grate for reinforcement. The filter system further includes pairs of lower and upper filter components 208 and 210 for use in filtering liquid flowing through the filter system. In a typical environment, the filter components 208 and 210 house filter material, such as absorbent materials 212 and/or geotextile fabrics (not shown). Alternatively, the filter components may be used by themselves where only a course filtering of the liquid is required or desirable.

As will be appreciated from the following description, the filter system 200 is substantially the same as the filter system shown in FIG. 7, but in which the rack, support structures and grates have been separated into approximate halves. The filter system 200 is an alternative to the filter systems shown in FIGS. 1 and 7 and is beneficial in situations where the weight of a rack, accompanying support structures and grates, and filter material, makes removal of the rack difficult when performing maintenance, for instance in situations in which storm drain opening 20 may be quite large.

The housing 202 is essentially the same as the housing 12 of FIGS. 1 and 7, but preferably includes a partition or wall 214 that splits the housing into approximate halves, forming filter chambers 216 out of the previous single filter chamber 26. Each filter chamber has a top inlet 217 adjacent the outer grating 24 of the storm drain, and a bottom outlet 218 for discharging liquids into the storm drain system. In addition, the housing 202 includes a pair of flanges 220 that extend outwardly from the partition 214. The reference numerals for the remaining features are the same as in FIG. 1. The flanges 220, in conjunction with flanges 34, provide support for the racks 204. It is noted that the housing may be constructed without the wall 214. In this case, the flanges 220 may be replaced with one or more cross members that extend between the sides of the housing to support the racks 204.

Each rack 204 is shaped similarly to rack 14, although racks 204 may be of a different size from rack 14. Each rack includes two formed, generally U-shaped side members 222, each including a pair of legs 224. The side members are coupled together by a plurality of cross members 226. The racks 204 are dimensioned slightly smaller than the inner walls of the housing (including the partition), such that each rack will fit into either of the filter chambers 216, with the legs resting on inwardly-extending flanges 34 and 220 of the housing. A top pair of cross members 226a and 226b extend across the width of each rack to provide handles to allow the racks to be lifted from the housing. The remaining cross members are positioned in pairs on opposite sides of the rack to span between corresponding legs of the side members to provide support for the ends of the lower and upper filter components 208 and 210. In this manner, the filter components are held essentially parallel to the top of the housing 202.

The lower filter components 208 are similar to the support structures 100 of FIG. 7. The upper filter components 210 are also similar to the support structures 100 of FIG. 7, each including four sides 232, and a pair of side rails 234 (only one shown) on two sides for supporting a grate 236. However, the upper filter components 210 may not include an upper grate.

In using the filter system 200, the lower filter components are filled with filter material, if desired, and placed on the racks 204. If desired, additional filter material, e.g., absorbent materials 212, is placed on the grates 236 of each upper filter component 210, which are then placed into the racks 204. The racks 204 (including the filter components) are then placed into a housing that has been pre-positioned in a storm drain or the like. Thereafter, the upper grate 206 is placed on top of the racks. The upper grate 206 extends across the entire length of the housing, and may or may not contain filter material, such as the material that has been placed into the upper filter components 210. A unitary upper grate is used instead of using individual grates because a single perforate surface helps to spread liquid flowing into the filter system evenly across the length of the filter system and thus aids liquid filtration. In addition to reinforcing the upper grate, the cross member 207 diverts water to either side of the filter system.

It is noted that the upper grate 206 may be replaced with a filter component that is shaped similar to the filter components 208 and 210. In this embodiment, the bottom grate is preferably reinforced with a cross member similar to the cross member 207.

In FIG. 14, a diverter 238 has been added to the filter system 200. The advantages of using a diverter are described in regard to FIG. 11 and accompanying text. In addition to the features described therein, the diverter 238 includes a plurality of bristles 240 that extend upwardly from one or more sides of the diverter. The bristles are designed to protrude through the outer grating of a storm drain system in an effort to catch leaves and other large debris before they enter the filter system. To accommodate the bristles 240, a pair of slits 242 have been cut into the outer grating 24. It is noted that the configuration of some gratings will enable the bristles to extend up and beyond the surface of the grating without modification to the grating. The bristles decrease the likelihood of clogging, thereby simplifying maintenance of the filter system.

In the embodiment shown in FIG. 14 there are bristles mounted on only two of the sides. The bristles are preferably mounted on those sides that receive the majority of the liquid entering the filter system. For example, if the filter system is mounted on a hill or an incline, the bristles on positioned along the upper slope. However, the bristles may extend around the entire circumference of the diverter.

Figure 15:
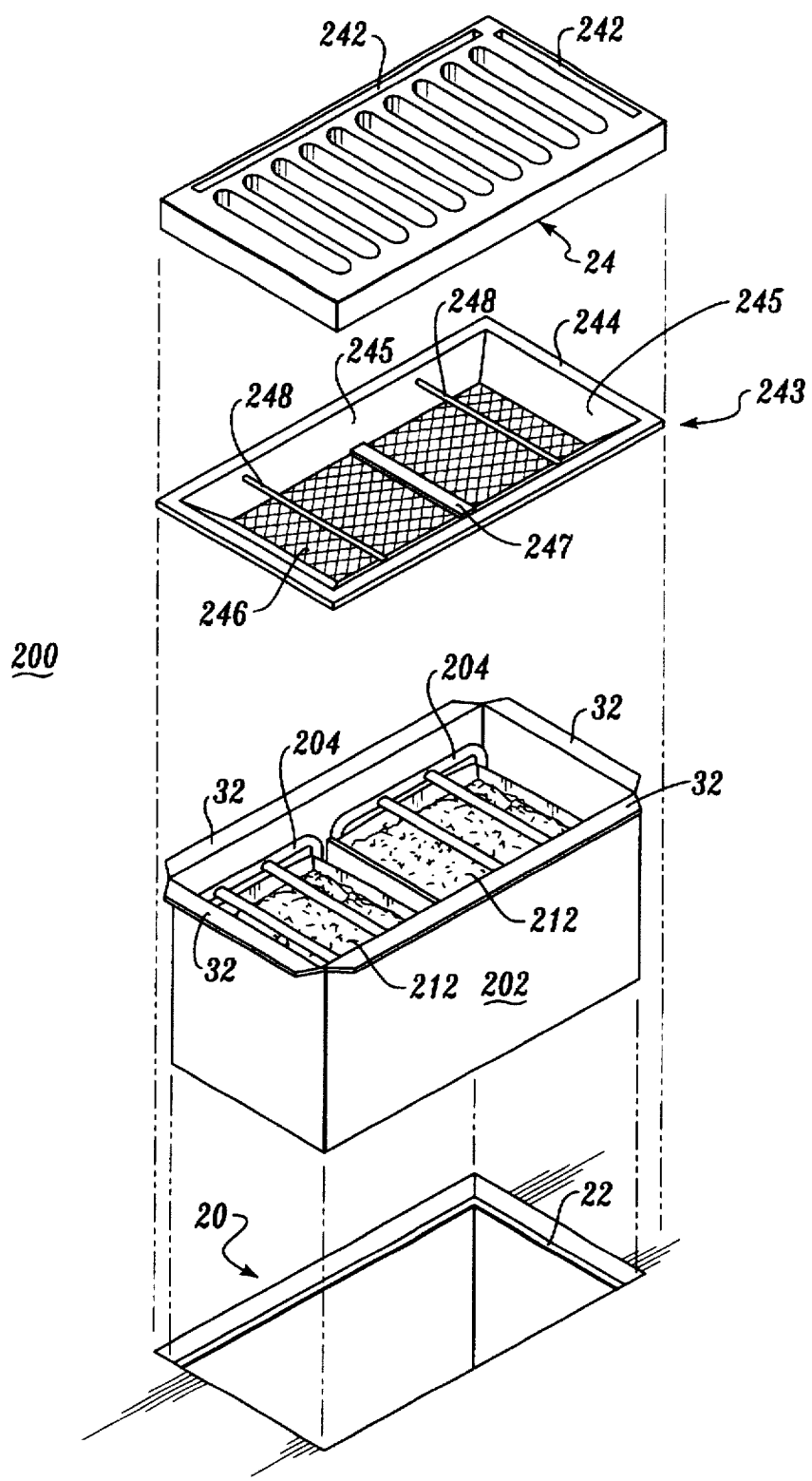
FIG. 15 illustrates a tenth exemplary embodiment of a filter system in accordance with the invention which is similar to the filter system of FIG. 13.

FIG. 15 illustrates a modification to the filter system 200 illustrated in FIGS. 13 and 14. Specifically, a sediment tray 243 replaces the diverter 238 and upper grate 206 by combining the function of each into an integral unit. Specifically, the sediment tray includes a perimeter section 244 that rests on top of the flanges, underneath the outer grating 24 of the storm drain. Extending down and inwardly from the perimeter section 245 are walls 245 that direct liquids flowing into the storm drain onto the lower and upper filter components of the filter system. A grate 246, including a cross member 247, is coupled to the walls of the sediment tray. The sediment tray further includes a pair of cross members 248 that extend between two sides of the sediment tray to reinforce the tray and provide handles that are useful in maintaining the filter system.

Figure 16:
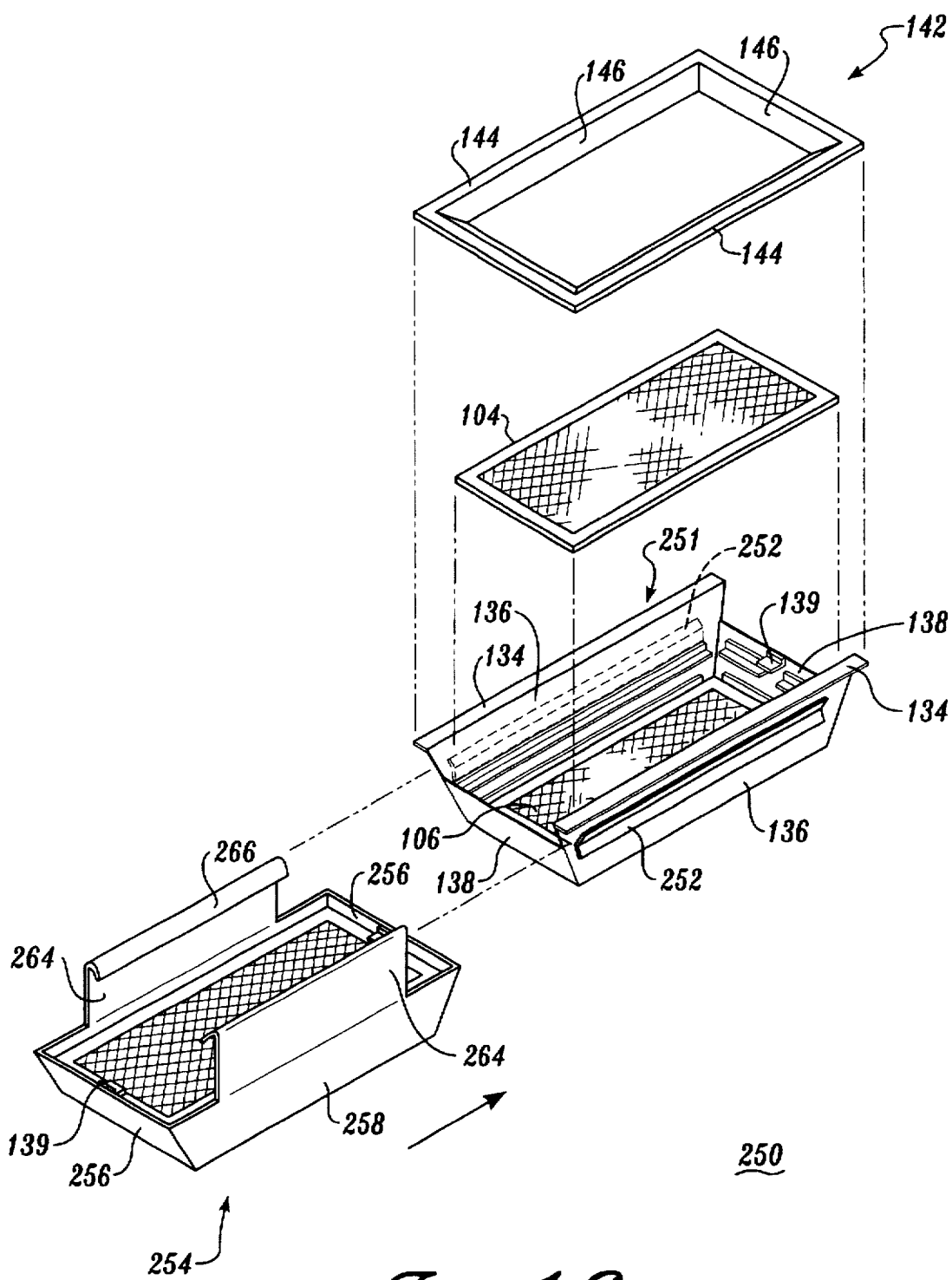
FIG. 16 is an eleventh exemplary embodiment of a filter system in accordance with the invention.
Figure 17:
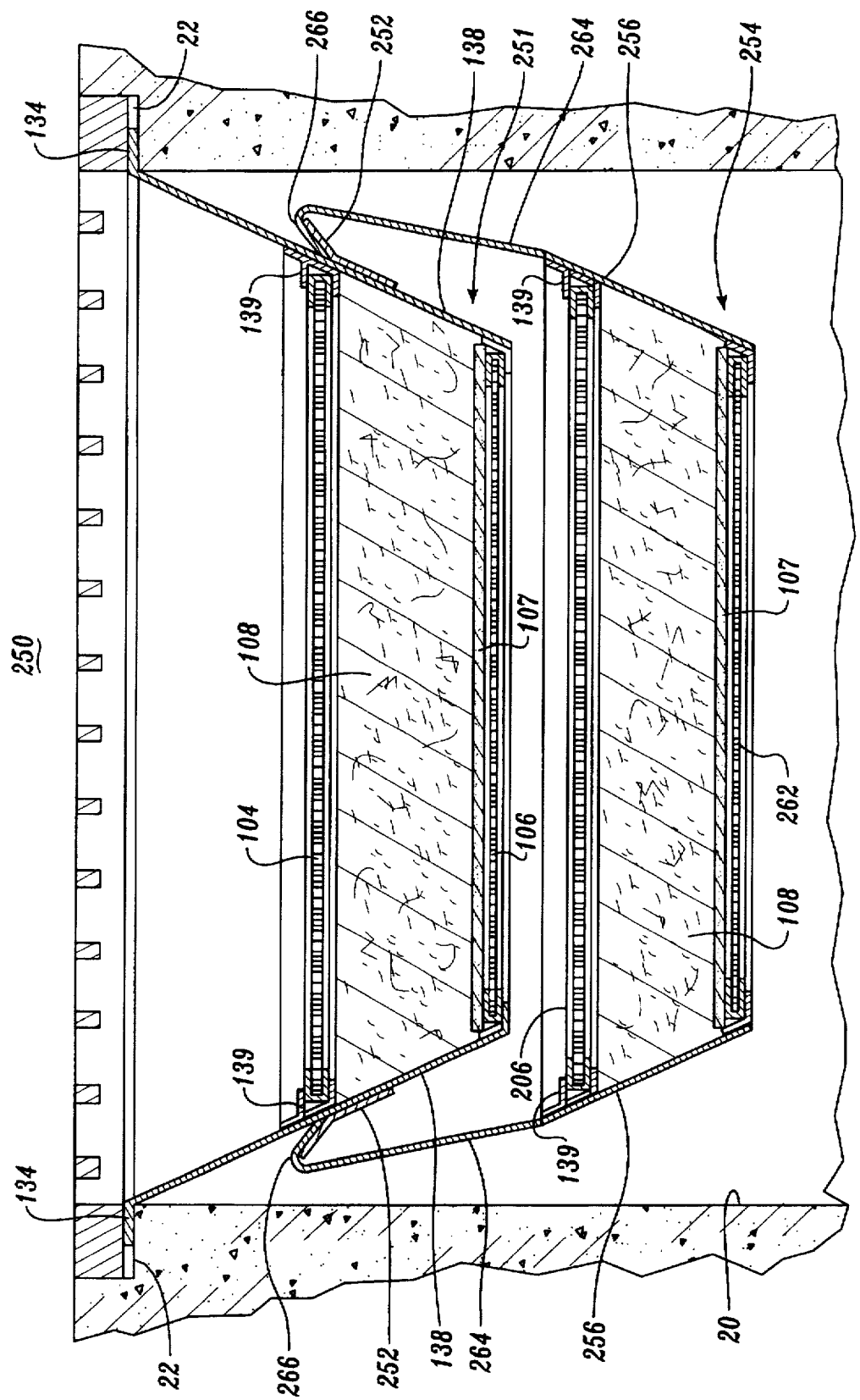
FIG. 17 is a cross section of the filter system shown in FIG. 15.

FIGS. 16 and 17 illustrate a filter system 250 that is an alternate embodiment of the filter system 130 shown in FIG. 10. More particularly, in some applications it is advantageous to add one or more additional filtering layers to the filter system 130. The embodiment shown in FIGS. 16 and 17 allows multiple layers to be implemented, without the added weight and expense of a housing and rack system.

The filter system 250 includes a first support structure 251 that is similar and retains the same component numbers as the support structure 132 in FIG. 10. However, the first support structure also includes a pair of upwardly and outwardly projecting side rails 252 that extend at least part of the length of the support structure 251 along an outer portion of the sides 136. The filter system also includes a second support structure 254 that is to be suspended beneath the support structure 251 to provide additional filtering.

The second support structure 254 includes a pair of end walls 256 that, in conjunction with a pair of sides 258, provide support for an upper and lower grate 260 and 262. In a manner similar to the support structure 132, a pair of clips 139 hold the upper grate 260 in place. Each side 258 has a bracket 264 that extends above the support structure and that includes an inward, downwardly extending flange 266. The inward flanges 266 cooperate with the side rails 252 of the first support structure 251 to hold the second support structure 254. This is accomplished by sliding the brackets onto the rails, as shown in FIG. 17. It will be appreciated that additional levels of support structures could be added.

The filter system of FIGS. 16 and 17 provides multi-level filtering without the need for a separate housing. The filter system 250 can be constructed from less material than the prior art, making it lighter and less expensive while still allowing relatively easy access to the filter material contained therein. Hurdles, not shown, may be added to the upper support structure 251 to facilitate removal of the filter system 250, for instance for maintenance. Also, additional support structures may be utilized by depending from support structure 254 in the same manner in which such support structure 254 depends from support structure 251.

While preferred embodiments of the invention have been illustrated and described, it will be appreciated that various changes can be made therein without departing from the spirit and scope of the invention. For example, an additional embodiment may include a reservoir for storing samples of liquid flowing through the filter system which may be used to determine the composition of liquids entering a storm drain or being discharged by a manufacturing operation. More particularly, a small pan or other container may be attached to one or more of the grates depicted in the filter systems of FIGS. 1–17 to collect liquid.

The embodiments of the invention in which an exclusive property or privilege is claimed are defined as follows:

1. A filter system having filter material to treat liquid flowing therethrough, comprising:
    (a) a housing having a peripheral wall and a partition which define first and second filter chambers therein, each filter chamber including an inlet for inflow of the liquid and an outlet for discharging the liquid;
    (b) a first removable rack for placement within the first filter chamber of the housing, the first rack being movable between a first position received in the first filter chamber and a second position removed from the first filter chamber;
    (c) a second removable rack for placement within the second filter chamber of the housing, the second rack being movable between a first position received in the second filter chamber and a second position removed from the second filter chamber;
    (d) a plurality of filter components, each filter component supporting a quantity of the filter material, the filter components held by the racks in the path of liquid flow when the racks are in the first position, and being separable from the path of liquid flow when the racks are in the second position; and
    (e) a diverter having a flange section that rests on the housing and a diversion wall that extends around the perimeter of the flange section and projects downwardly and inwardly from the flange section for directing liquids flowing toward the center of the filter system, onto the filter components.

2. The filter system of claim 1, wherein the diverter further includes bristles that project upwardly from the flange section to catch debris prior to entering the filter system.

3. Apparatus for supporting filter materials for treating liquid flowing therethrough, comprising:
    (a) a housing comprising a peripheral wall extending about the perimeter of the housing and partitions to cooperate with the peripheral wall to define a plurality of filter chambers therein, the filter chambers including an inlet for inflow of the liquid and an outlet for discharging the liquid;
    (b) a plurality of filter material supports, each filter material support housing a quantity of filter material;
    (c) racks dimensioned to fit into the filter chambers of the housing, each rack being structurally independent of the filter material supports, each rack being movable between a first position received in a filter chamber and a second position removed from the filter chamber, each rack having means for holding the filter material supports in the path of liquid flow when the rack is in the first position and when the rack is in the second position the filter material supporting being liftable away from the corresponding rack to provide access to the filter material housed in the filter material supports; and
    (d) the filter material supports sized to define a gap between the filter material support and housing when the filter material support is held by a rack, the gap permitting overflow liquid from the filter material support to bypass the filter material.

4. The filter system of claim 3, wherein each rack is an open-wire rack including two generally U-shaped side members and a plurality of cross members that couple the side members together, with each side member defining a pair of legs for the rack.

5. The filter system of claim 3, wherein each filter material support includes side walls defining a shape corresponding to the shape of the housing, a lower grate, and brackets projecting from the side walls to support the lower grate.

6. The filter system of claim 5, wherein each filter material support further includes an upper grate that is supported by the side walls in a position above the lower grate.

7. A filter system to be used in conjunction with a storm drain, the storm drain having an outer grating supported on a ledge that extends around the perimeter of the storm drain and a perimeter wall extending into the storm drain from the ledge, the filter system having filter material positioned to filter liquid flowing therethrough, comprising:
   (a) a first support structure, to be positioned within the storm drain and underneath the outer grating, including side walls, a top grate, and a bottom grate which define a housing for filter material, the first support structure further including an outwardly extending flange dimensioned to contact the ledge of the storm drain when the first support structure is placed into the storm drain, beneath the outer grating;
   (b) a second support structure including side walls, a top grate, and a bottom grate which define a housing for filter material;
   (c) means for coupling the first ad second support structures wherein the second support structure is suspended below the first support structure to filter liquid after it has entered the storm drain and passed through the first support structure; and
   (d) a gap between the perimeter wall of the storm drain and at least one of the first and second support structures to permit overflow liquid from the support structure to bypass the filter material within the support structure and flow into the storm drain.

8. The filter system of claim 7, wherein the means for coupling includes a pair of rails positioned along two of the side walls of the first support structure and a pair of brackets, each bracket extending upwardly from one of the side walls to cooperatively engage one of the rails when the second support structure is suspended below the first support structure.

9. A filter system to be used in conjunction with a storm drain, the storm drain having an outer grating supported on a ledge that extends around the perimeter of the storm drain, the filter system having filter material positioned to filter liquid flowing therethrough, comprising:
   (a) a first support structure, to be positioned within the storm drain and underneath the outer grating, including side walls, a top grate, and a bottom grate which define a housing for filter material, the first support structure further including an outwardly extending flange dimensioned to contact the ledge of the storm drain when the first support structure is placed into the storm drain, beneath the outer grating;
   (b) a second support structure including side walls, a top grate, and a bottom grate which define a housing for filter material;
   (c) means for coupling the first and second support structures wherein the second support structure is suspended below the first support structure to filter liquid after it has entered the storm drain and passed through the first support structure; and
   (d) a diverter having a flange section that rests on the ledge of the storm drain, underneath the outer grating of the storm drain, and a diversion wall extending around the perimeter of the storm drain and projecting downwardly and inwardly from the flange section for directing liquids flowing toward the center of the storm drain onto the filter components.

10. The filter system of claim 9, wherein the diverter further includes bristles that project upwardly from the flange section through the outer grating to catch debris prior to entering the filter system.

11. A filter system for filtering a liquid medium, the filter system having filter material to treat liquid flowing through an inlet opening leading into the filter system, comprising:
    (a) a housing having a peripheral wall defining a filter chamber therein, the filter chamber including an inlet for inflow of liquid entering the inlet opening of the filter system and an outlet for discharging the liquid from the filter chamber, the housing having means for supporting the housing within the opening of the filter system to occupy substantially the entire opening of the filter system;
    (b) a removable rack for placement within the filter chamber of the housing, the rack being movable between a first position received in the filter chamber and a second position removed from the filter chamber;
    (c) one or more filter components, each filter component supporting a quantity of the filter material, the filter components being structurally independent of and normally held by the rack in the path of liquid flow, and being separable from the path of liquid flow when the rack is in the second position;
    (d) means for directing into the housing substantially all of the liquid medium entering in the filter system opening; and
    (e) the filter components having an outer perimeter configured to define a gap between the filter components and the peripheral wall of the housing to allow passage therebetween of overflow liquid from the filter components.

12. The filter system of claim 11, wherein:
    (a) the housing having a peripheral wall and a partition which define first and second filter chambers therein, each filter chamber including an inlet for inflow of the liquid and an outlet for discharging the liquid;
    (b) further comprising a first removable rack for placement within the first filter chamber of the housing, the first rack being movable between a first position received in the first filter chamber and a second position removed from the first filter chamber;
    (c) further comprising a second removable rack for placement within the second filter chamber of the housing, the second rack being movable between a first position received in the second filter chamber and a second position removed from the second filter chamber;
    (d) further comprising a plurality of filter components, each filter component supporting a quantity of the filter material, the filter components being structurally independent of the racks, and being held by the racks in the path of liquid flow when the racks are in the first position, and being separable from the path of liquid flow when the racks are in the second position; and
    (e) wherein the filter components having an outer perimeter wherein at least a part of such outer perimeter is spaced away from the housing perimeter wall and partition to define a gap therebetween to permit overflow liquid from the filter components to bypass the filter components.

13. The filter system of claim 12, and further including an upper grate that is dimensioned to fit inside the housing, above the filter chambers to overlie both filter chambers.

14. The filter system of claim 12, and further including a filter component that is dimensioned to fit inside the housing, above the filter chambers to overlie both filter chambers.

15. The filter system of claim 12, wherein each filter component is held by one of the racks in an orientation that is substantially perpendicular to the flow of liquid through the filter system.

16. The filter system of claim 12, wherein the housing further includes two inwardly extending sections near the outlet of each filter chamber that cooperate to hold the racks within the filter chamber.

17. The filter system of claim 12, wherein each filter component includes at least one removable container that houses absorbent materials.

18. The filter system of claim 17, wherein each removable container includes side walls and a lower grate, with the side walls including brackets that support the lower grate.

19. The filter system of claim 18, wherein the removable container further includes an upper grate that is supported by the removable container in a position above the lower grate.

20. The filter system of claim 17, wherein the containers are comprised of a porous, supple material.

21. The filter system of claim 12, wherein the housing is dimensioned to fit within a storm drain.

22. The filter system of claim 12, and further including one or more perforated plates for supporting the filter components.

23. The filter system of claim 11, further including an uppermost grate supportable by a rack of the uppermost grate having a substantially flat, middle section and side sections that slope downwardly from the middle section.

24. A filter system to be used in conjunction with a storm drain, the storm drain having an inlet opening, an outer grating supported on a ledge that extends around the perimeter of the storm drain inlet opening, the filter system using absorbent materials to filter liquid flowing into the inlet opening of the storm drain, comprising:
    (a) top and bottom grates, the bottom grate providing a shelf capable of supporting absorbent materials;
    (b) support means, to be positioned within the storm drain at the inlet opening and underneath the outer grating of the storm drain, for supporting the top and bottom grates, the support means including:
        an opening top that is nearest the outer grating and an open bottom that is distal from the open top,
        an outwardly extending perimeter flange that extends along the top of the support means, the flange contacting the ledge of the storm drain inlet opening when the support means is placed into the storm drain inlet opening, beneath the outer grating at least one gap in the perimeter flange thereby to define an overflow spillway for the liquid flowing into the support means from the storm drain inlet opening; and,
        walls extending downwardly from the perimeter flange to define a cross-sectional area; and
    (c) the top and bottom grates occupying substantially the entire cross-sectional area defined by the walls extending downwardly from the perimeter flange.

25. The filter system of claim 24, wherein the support means are configured to enable the top and bottom grates to be removable from the support means.

26. The filter system of claim 24, wherein the support means includes a shallow housing having side wall structures for supporting the top and bottom grates.

27. A liquid medium filter system for a drainage system, the liquid drainage system having an outer protective grating supported on a ledge that extends around the perimeter of an opening to the drainage system, the filter system having absorbent materials positioned to file liquid flowing into the opening to the drainage system, comprising:
    (a) a housing to be positioned within the drainage system opening and underneath the outer grating, the housing having a top that is nearest the outer grating and a bottom opposite the top, the housing having means for suspending the housing from the perimeter ledge of the drainage system opening to occupy substantially the entire area of the drainage system opening;
    (b) one or more filter components, each filter component including means for supporting the absorbent materials, the absorbent materials removing contaminants and particulate matter from liquid flowing into the drainage system and through the filter system;
    (c) a removable rack dimensioned to be receivable within the housing through the top of the housing and including a plurality of holding members that support the filter components, the housing and the rack having cooperating members that in a first position are engaged to support the rack within the housing, and that in a second position are disengaged to allow the rack to be removed from the housing upwardly through the housing top to provide access to the filter components, the rack having manually graspable portions for grasping when engaging the rack with and removing the rack from the housing; and
    (d) a diverter having a flange section that rests on top of the housing and a diversion wall projecting downwardly and inwardly from the flange section for directing liquids flowing toward the center of the drainage system opening onto the filter components.

28. A liquid medium filter system for a drainage system, the liquid drainage system having an outer protective grating supported on a ledge that extends around the perimeter of an opening to the drainage system, the filter system having absorbent materials positioned to filter liquid flowing into the opening to the drainage system, comprising:
    (a) a housing to be positioned within the drainage system opening and underneath the outer grating, the housing having a top that is nearest the outer grating and a bottom oppose the top, the housing having means for suspending the housing from the perimeter ledge of the draining system opening to occupy substantially the entire area of the drainage system opening;
    (b) one or more filter components, each filter component including means for supporting the absorbent materials, the absorbent materials removing contaminants and particulate matter from liquid flowing into the drainage system and through the filter system;
    (c) a removable rack dimensioned to be receivable within the housing through the top of the housing and including a plurality of holding members that support the filter components, the rack being structurally independent of the filter components to removably support the filter components, the housing and the rack having cooperating members that in a first position are engaged to support the rack within the housing, and that in a second position are disengaged to allow the rack to be removed from the housing upwardly through the housing top to provide access to the filter components, the rack having manually graspable portions for grasping when engaging the rack with and removing the rack from the housing; and
    (d) the filter components sized to define a gap between the filter components and the housing when the filter components are supported in first position within the housing by the rack, the gap permitting overflow liquid from the filter component to bypass the absorbent material supported by the filter components and flow toward the bottom of the housing.

29. The filter system of claim 28, wherein the filter components comprise a plurality of grates, each providing a shelf capable of supporting absorbent materials.

30. The filter system of claim 28, wherein each filter component includes a removable container that holds absorbent materials.

31. The filter system of claim 30, wherein the container is comprised of a porous, supple material.

32. The filter system of claim 31, wherein the material comprising the container is a mesh fabric.

33. The filter system of claim 28, further including an uppermost grate supported by the rack having a substantially flat, middle section and side sections that slope downwardly from the middle section.

34. The filter system of claim 28, further including a generally trough-shaped, uppermost grate that is supported in inverted orientation by the rack, with the peak of the uppermost grate being adjacent the top of the housing and the sides of the uppermost grate extending downward, toward the bottom of the housing.

35. The filter system of claim 28, further including an uppermost grate that is supported by the rack, with the rack being dimensioned such that the uppermost grate is positioned at a slope relative to a plane defined by the top of the housing.

36. The filter system of claim 28, wherein the means for suspending the housing within the drain system opening comprises an outwardly extending flange that extends around the top of the housing, the flange contacting the ledge of the drainage system when the housing is placed into the drainage system, beneath the outer grating.

37. The filter system of claim 28, wherein each filter component comprises a grate support structure including side walls, a top grate and a bottom grate, the side walls and grates housing absorbent materials within the grate support structure.

38. The filter system of claim 28, wherein the housing further comprising means for directing substantially all of the liquid entering into the drainage system opening initially into the housing.

* * * * *